US012576766B2

(12) United States Patent (10) Patent No.: US 12,576,766 B2
Jeon et al. (45) Date of Patent: Mar. 17, 2026

(54) HEADREST, VEHICLE, AND METHOD OF ADJUSTING THE HEADREST

(71) Applicant: GM GLOBAL TECHNOLOGY OPERATIONS LLC, Detroit, MI (US)

(72) Inventors: Minseok Jeon, Gimpo City (KR); Imtack Hong, Seoul (KR); Jinsup Kim, Incheon City (KR); Duckjae Won, Incheon City (KR)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 18/748,276

(22) Filed: Jun. 20, 2024

(65) Prior Publication Data

US 2025/0388156 A1 Dec. 25, 2025

(51) Int. Cl.
B60N 2/868 (2018.01)

(52) U.S. Cl.
CPC .................................... B60N 2/868 (2018.02)

(58) Field of Classification Search
CPC .......... B60N 2/868; B60N 2/806; B60N 2/80;
B60N 2/874; B60N 2/809; B60N 2/885;

B60N 2/879; B60N 2/986; B60N 2/99;
B64D 11/0642; B64D 11/0606; B60R
2011/0017; B60R 2021/0048
See application file for complete search history.

(56) References Cited

FOREIGN PATENT DOCUMENTS

| DE | 19782021 T1 | 9/1999 |
| DE | 102020200924 A1 | 7/2020 |
| FR | 2929185 A1 | 10/2009 |
| JP | 2008074156 A | 4/2008 |

*Primary Examiner* — Victoria Hicks Fisher

(74) *Attorney, Agent, or Firm* — Quinn IP Law

(57) ABSTRACT

A headrest includes a housing defining a channel therethrough, a primary support cushion disposed on the housing, and an extension cushion disposed within the channel and translatable between a stowed position in which the extension cushion is stored within the channel and an extended position in which the extension cushion extends from the housing. A vehicle includes a body defining a passenger compartment and a seat disposed within the passenger compartment. The seat includes a frame, a seating surface supported by the frame, and the headrest attached to the frame. A method of adjusting the headrest includes determining whether the vehicle is in a parked or driving state and whether an actuator is in an on or off condition. If the actuator is in the on condition and the vehicle is in the parked state, the method includes translating the headrest from the stowed to the extended position.

19 Claims, 5 Drawing Sheets

HEADREST, VEHICLE, AND METHOD OF ADJUSTING THE HEADREST

INTRODUCTION

The disclosure relates to a headrest, a vehicle, and a method of adjusting the headrest.

Seats designed to accommodate occupants of vehicles, such as automotive seats, aviation seats, and the like are an essential component of a vehicle's interior and provide comfort and support for occupants during travel. A seat may include a seat cushion and a seat back that may be formed from foam or other cushioning materials, may optionally include bolsters, and may be covered with upholstery. The seat may also include a head restraint or headrest designed to support a head and neck of an occupant of the vehicle. Such headrests may be of fixed size and shape and may contribute to a comfort level of the seat.

SUMMARY

A headrest includes a housing defining a channel therethrough, a primary support cushion disposed on the housing, and an extension cushion disposed within the channel. The extension cushion is translatable between a stowed position in which the extension cushion is stored within the channel and an extended position in which the extension cushion extends from the housing.

In one aspect, the extension cushion may be laterally translatable within the channel.

In an additional aspect, the primary support cushion may have a rest surface. The channel may include a first end and a second end laterally spaced apart from the first end. The extension cushion may protrude from one of the first end and the second end to thereby extend the rest surface when the extension cushion is in the extended position.

In another aspect, the housing may have a central longitudinal axis and a horizontal axis that is perpendicular to the central longitudinal axis. The housing may also have a first lateral side spaced apart from the central longitudinal axis along the horizontal axis, and a second lateral side spaced apart from the central longitudinal axis and the first lateral side along the horizontal axis. The housing may further define a first void at a first end of the channel that extends along a first axis that is substantially parallel to the central longitudinal axis on the first lateral side, and a second void at a second end of the channel that extends along a second axis that is substantially parallel to the central longitudinal axis on the second lateral side. The extension cushion may be translatable along the horizontal axis to thereby extend out of one of the first void and the second void in the extended position.

In a further aspect, the extension cushion may have a front surface that faces the housing and a back surface spaced opposite the front surface and substantially parallel to the central longitudinal axis. The extension cushion may also have a top surface interconnecting the front surface and the back surface, and a bottom surface spaced opposite the top surface and substantially perpendicular to the central longitudinal axis.

In one aspect, the extension cushion may be hollow and concave with respect to the central longitudinal axis.

In an additional aspect, the back surface may have a first length and the front surface may have a second length that is less than the first length.

In another aspect, the back surface may define a plurality of slots therein extending in a direction substantially parallel to the horizontal axis.

In a further aspect, the headrest may further include a plurality of pins each affixed to the primary support cushion and disposed within one of the plurality of slots.

In one aspect, the headrest may further include a member attached to the housing and defining a cavity therein.

In an additional aspect, the headrest may further include a worm and pinion gear disposed within the cavity and configured for translating the extension cushion between the stowed position and the extended position.

In another aspect, the headrest may further include an actuator disposed within the cavity and configured for electrically controlling a position of the worm and pinion gear. The actuator may be transitionable between an off condition in which the extension cushion is not translatable between the stowed position and the extended position, and an on condition in which the actuator electrically controls the position of the worm and pinion gear and the extension cushion is translatable between the stowed position and the extended position.

In a further aspect, the housing may be rigid and formed from a metal and the primary support cushion may be resilient and formed from a foam. The housing may further include a cover disposed on the primary support cushion.

In one aspect, a seat for a vehicle may include the headrest.

A vehicle includes a body defining a passenger compartment and a seat disposed within the passenger compartment. The seat includes a seat frame, a seating surface supported by the seat frame, and a headrest attached to the seat frame. The headrest includes a housing defining a channel therethrough and a primary support cushion disposed on the housing. The housing also includes an extension cushion disposed within the channel and translatable between a stowed position in which the extension cushion is stored within the channel and an extended position in which the extension cushion extends from the channel.

In one aspect, the vehicle may further include a plurality of seats arranged in a plurality of rows, and each of the plurality of rows may include at least one of the plurality of seats.

In an additional aspect, the vehicle may be transitionable between a parked state in which the vehicle is stationary and the extension cushion is translatable from the stowed position to the extended position. The vehicle may also have a driving state in which the vehicle is not in the parked state and the extension cushion is not translatable to the extended position.

In another aspect, the housing may have a central longitudinal axis and a horizontal axis that is perpendicular to the central longitudinal axis. The housing may also have a first lateral side spaced apart from the central longitudinal axis along the horizontal axis, and a second lateral side spaced apart from the central longitudinal axis and the first lateral side along the horizontal axis. The headrest may be translatable along the central longitudinal axis to thereby adjust a spacing between the headrest and the seating surface. The extension cushion may be laterally translatable within the channel along the horizontal axis.

A method of adjusting a headrest includes determining whether a vehicle is in a parked state or a driving state and whether an actuator is in an on condition or an off condition. The vehicle includes a body defining a passenger compartment and a seat disposed within the passenger compartment. The seat includes a seat frame, a seating surface supported by the seat frame, and a headrest attached to the seat frame. The headrest includes a housing defining a channel therethrough, a primary support cushion disposed on the housing, and an extension cushion disposed within the channel. The extension cushion is translatable between a stowed position in which the extension cushion is stored within the channel and an extended position in which the extension cushion extends from the channel. If the actuator is in the off condition, the method includes holding the headrest within the channel such that the extension cushion does not translate from the stowed position to the extended position. If the actuator is in the on condition and the vehicle is in the driving state, the method includes at least one of holding the headrest within the channel such that the extension cushion does not translate from the stowed position to the extended position, and automatically translating the headrest from the extended position to the stowed position. If the actuator is in the on condition and the vehicle is in the parked state, the method includes translating the headrest from the stowed position to the extended position to thereby adjust the headrest.

In one aspect, the housing may include a central longitudinal axis and a horizontal axis that is perpendicular to the central longitudinal axis. The housing may also include a first lateral side spaced apart from the central longitudinal axis along the horizontal axis, and a second lateral side spaced apart from the central longitudinal axis and the first lateral side along the horizontal axis. Translating the headrest from the stowed position to the extended position may include laterally elongating the headrest from one of the first lateral side and the second lateral side.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figures 1, 2:
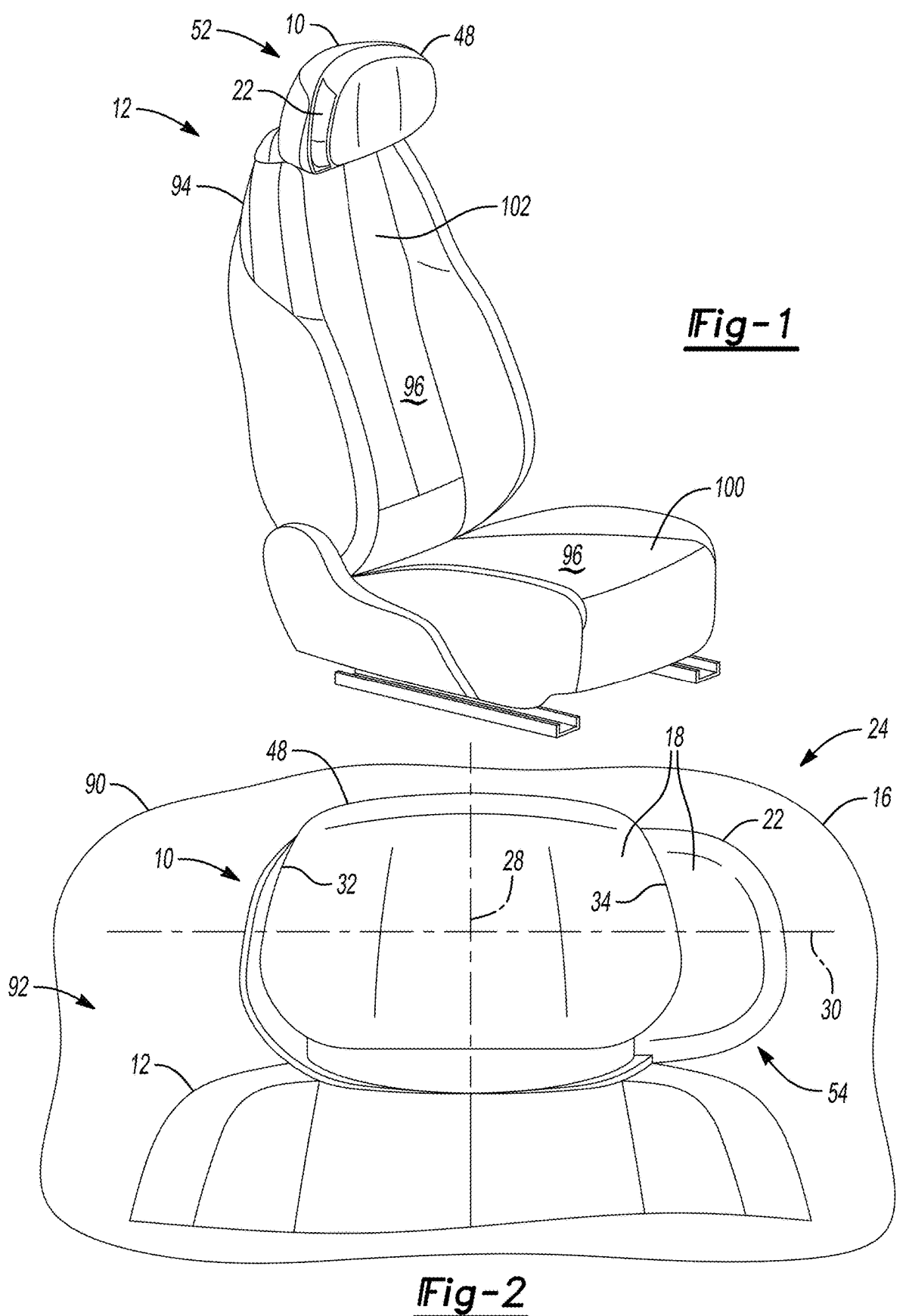
FIG. 1 is a schematic illustration of a perspective view of a seat including a headrest.
FIG. 2 is a schematic illustration of a front view of the headrest of FIG. 1 including an extension cushion disposed in an extended position.
Figures 5, 6:
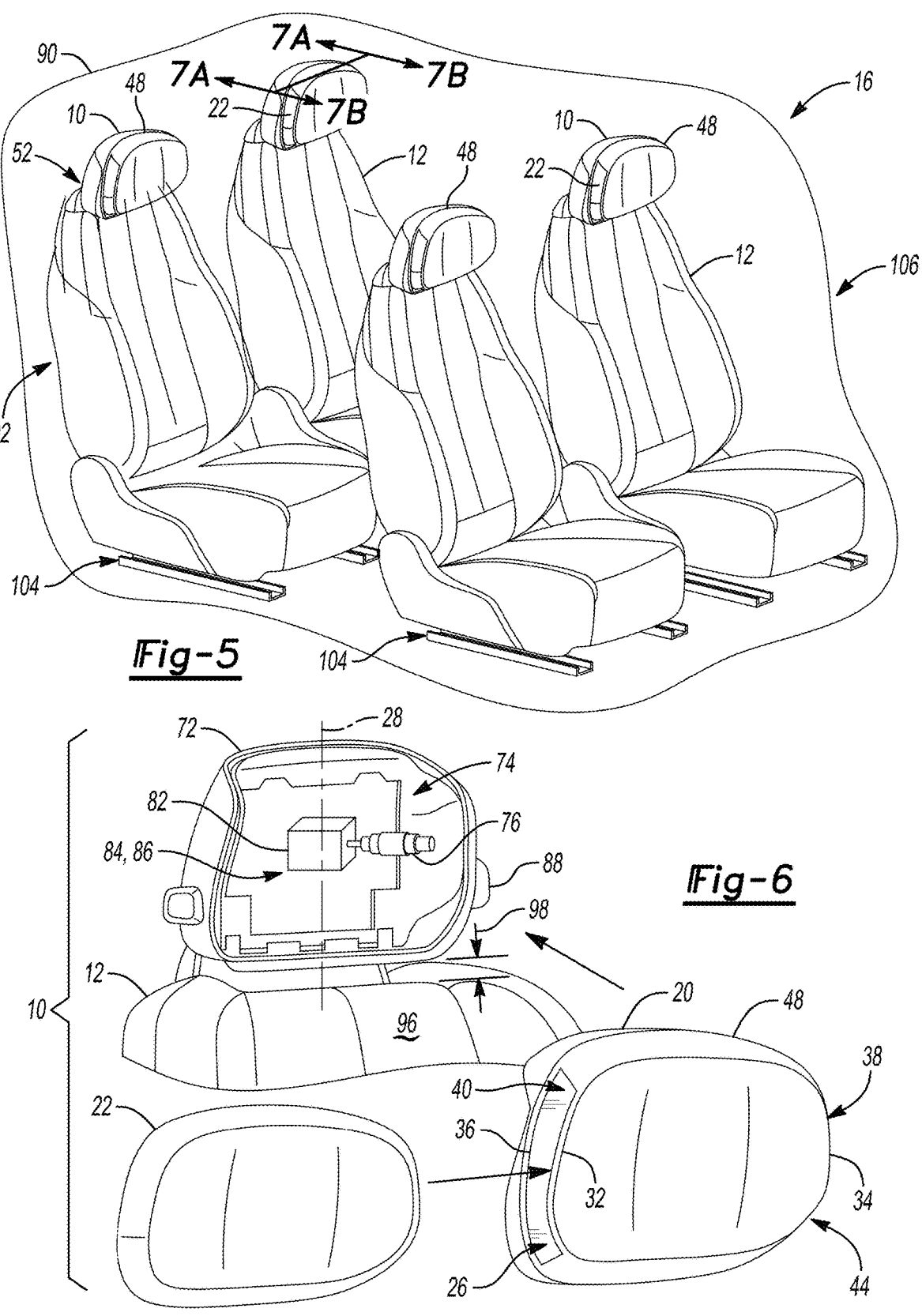
FIG. 5 is a schematic illustration of a perspective view of a vehicle including the seat and headrest of FIG. 1.
FIG. 6 is a schematic illustration of an exploded view of the headrest of FIG. 1.

Referring to the Figures, wherein like reference numerals refer to like elements, a headrest 10 (FIGS. 1 and 2) for a seat 12 (FIG. 1) and a method 14 (FIG. 8) of adjusting the headrest 10 are shown generally. The headrest 10 and method 14 may be useful for applications requiring adjustable and comfortable seating for an occupant (not shown) of a vehicle 16 (FIGS. 2 and 5). In particular, the headrest 10 and method 14 may be useful for adjusting a comfort level, size, and shape of a rest surface 18 (FIGS. 2 and 3) of the headrest 10 based on a resting position preference of the occupant to thereby reduce fatigue and enhance comfort of the occupant. In particular, the headrest 10 and method 14 may be useful for occupants who wish to comfortably sleep or rest in a parked vehicle 16.

Figure 3:
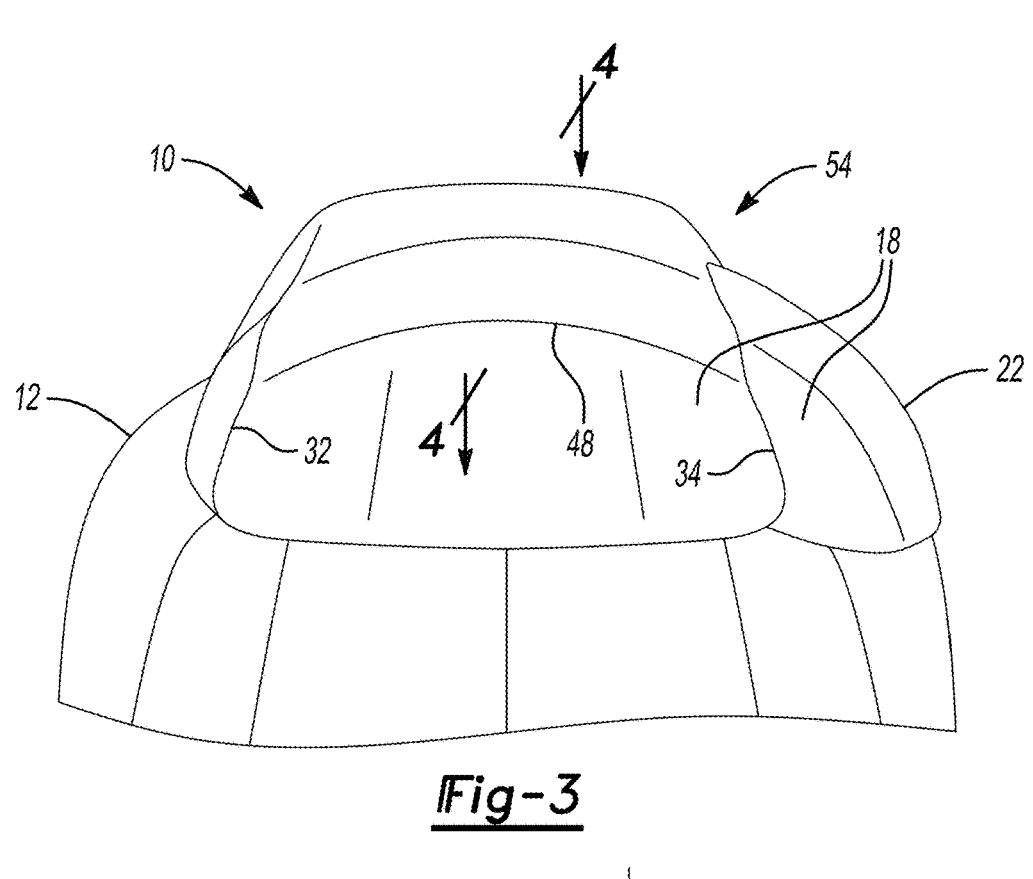
FIG. 3 is a schematic illustration of a top view of the headrest to FIGS. 1 and 2.
Figure 4:
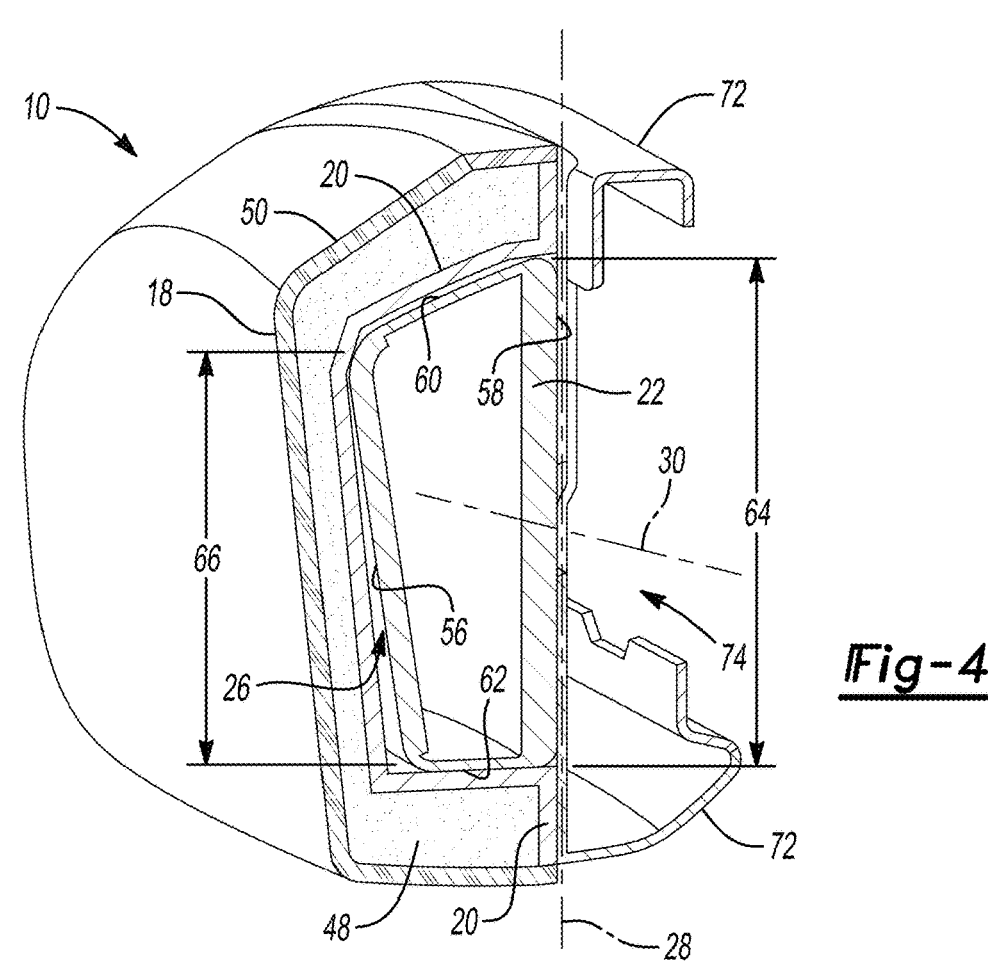
FIG. 4 is a schematic illustration of a cross-sectional view of the headrest of FIG. 3 taken along section line 4-4.

More specifically, as best shown in FIGS. 3 and 4, the headrest 10 includes a housing 20 and an extension cushion 22 that may be laterally translatable to protrude or extend from the housing 20. Therefore, as described with reference to FIG. 2, while the vehicle 16 is in a parked state 24, the occupant may expand the rest surface 18 of the headrest 10 by extending the extension cushion 22 from the housing 20 (FIG. 3). As such, the headrest 10 may provide excellent support and comfort for the occupant while the occupant rests or sleeps in the seat 12 when the vehicle 16 is in the parked state 24. That is, as set forth in more detail below, the headrest 10 provides lateral adjustability and enhanced support, protection, and comfort for the occupant via the extension cushion 22.

In particular, an ability to adjust the headrest 10 laterally or horizontally provides the occupant with greater flexibility and ease in finding a comfortable resting position and reduces discomfort during parking breaks or extended stops of the vehicle 16. Further, the occupant can tailor a position of the headrest 10 to accommodate individual preferences and sleeping habits, which may promote better relaxation and minimize neck strain. In addition, despite inclusion of the extension cushion 22 in the headrest 10, the headrest 10 maintains rigidity and effectively supports and protects the occupant upon a sudden deceleration or change in momentum or direction of the vehicle 16, or upon contact between the vehicle 16 and an object external to the vehicle 16.

Therefore, the headrest 10 and method 14 may be useful for automotive applications such as, but not limited to, passenger seats and driver seats. For example, the vehicle 16 (FIG. 5), such as a motor vehicle 16 powered by at least one of an internal combustion engine (not shown) and an energy storage device (not shown), may include the seat 12 that includes the headrest 10. Alternatively, the headrest 10 and method 14 may be useful for non-automotive applications such as, but not limited to, aerospace, aviation, marine, mass transportation, agricultural, industrial, and rail applications.

Referring now to FIG. 4, the headrest 10 includes the housing 20 defining a channel 26 therethrough. The housing 20 may have a central longitudinal axis 28 and a horizontal axis 30 that is perpendicular to the central longitudinal axis 28. Further, as best shown in FIG. 2, the housing 20 may have a first lateral side 32 spaced apart from the central longitudinal axis 28 along the horizontal axis 30, and a second lateral side 34 spaced apart from the central longitudinal axis 28 and the first lateral side 32 along the horizontal axis 30.

Figures 7A, 7B:
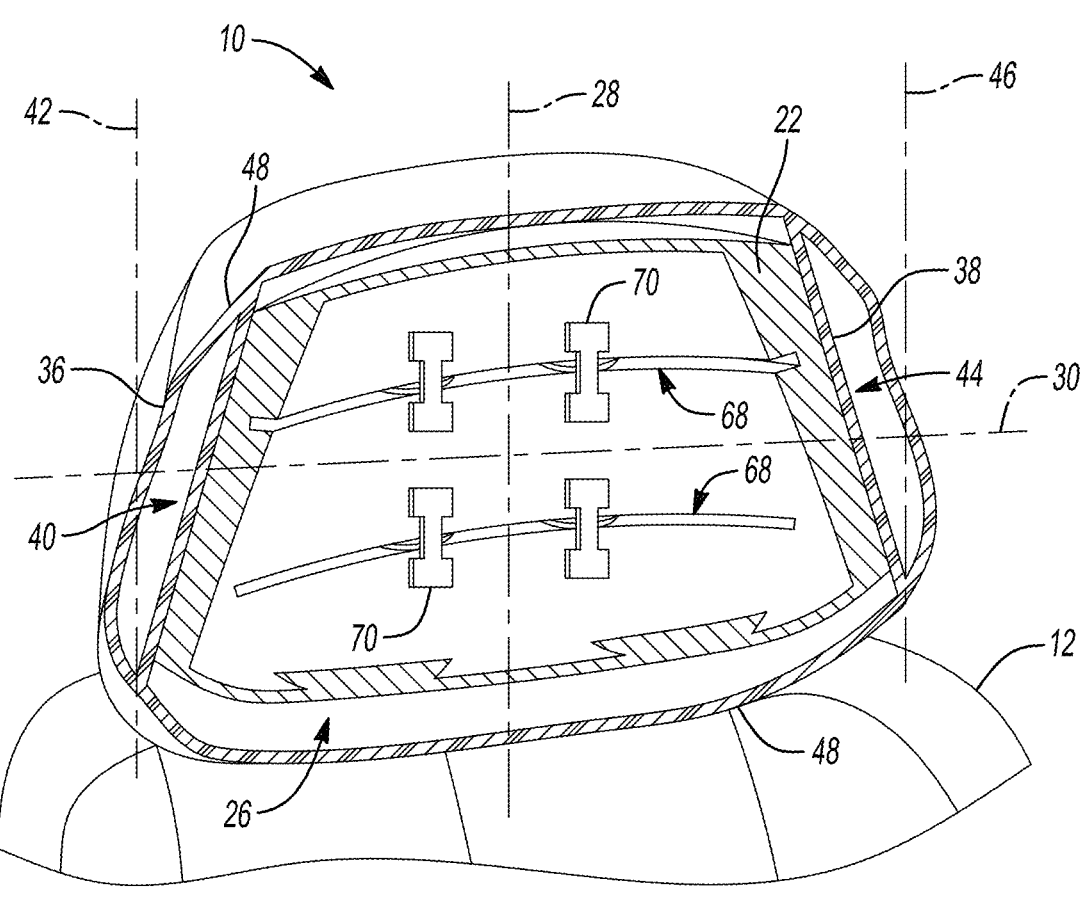
FIG. 7A is a schematic illustration of a cross-sectional view of the headrest of FIG. 5 taken along section line 7A-7A.
FIG. 7B is a schematic illustration of a cross-sectional view of the headrest of FIG. 5 taken along section line 7B-7B.

As described with reference to FIG. 6, the channel 26 may include a first end 36 and a second end 38 laterally spaced apart from the first end 36. That is, as best shown in FIG. 4, the channel 26 may extend lengthwise along the headrest 10 in a direction substantially parallel to the horizontal axis 30. Referring to FIG. 7A, the housing 20 may further define a first void 40 at the first end 36 of the channel 26 that extends along a first axis 42 that is substantially parallel to the central longitudinal axis 28 on the first lateral side 32. Likewise, the housing 20 may define a second void 44 at the second end 38 of the channel 26 that extends along a second axis 46 that is substantially parallel to the central longitudinal axis 28 on the second lateral side 34. Therefore, the channel 26 may extend completely through the housing 20.

As set forth in more detail below, in one non-limiting example, the channel 26 may have a concave shape when respect to the central longitudinal axis 28. That is, although the channel 26 may extend through the housing 20 in a lateral direction, the channel 26 may have a slight degree of curvature to enhance comfort for the occupant.

The housing 20 may be configured to provide structural support for other components of the headrest 10 and may therefore be rigid. That is, even though the housing 20 defines the channel 26 therethrough, the housing 20 may maintain rigidity. As such, the headrest 10 may protect and support the occupant during a sudden deceleration or change in momentum or direction of the vehicle 16, for example, upon contact between the vehicle 16 and an object external to the vehicle 16. In one non-limiting example, the housing 20 may be formed from a metal such as steel.

Referring again to FIGS. 2 and 4, the headrest 10 also includes a primary support cushion 48 disposed on the housing 20. The primary support cushion 48 includes the rest surface 18 and may be configured for supporting a head, neck, and upper spine of the occupant. As such, the primary support cushion 48 may be resilient and, in one non-limiting example, may be formed from a foam. As best shown in FIG. 3, the primary support cushion 48 may also have a concave shape with respect to the central longitudinal axis 28 (FIG. 2). That is, the primary support cushion 48 may have a slight degree of curvature to enhance the comfort of the headrest 10 for the occupant. Alternatively or additionally, although not shown, the primary support cushion 48 may include raised regions or bolsters to enhance a shape and function of the headrest 10.

As best shown in FIG. 4, the primary support cushion 48 is disposed on the housing 20. For example, the primary support cushion 48 may wrap and abut the housing 20 to cushion the occupant from the comparatively hard and rigid housing 20. The primary support cushion 48 may be attached to the housing 20 with an adhesive, a fastener, or the like. The headrest 10 may also include a cover 50 disposed on the primary support cushion 48. The cover 50 may enhance the aesthetics of the headrest 10, may form an exterior of the headrest 10, may hold the primary support cushion 48 in place, and may be formed from, by way of non-limiting examples, polyvinyl chloride, leather, upholstery, fabric, and the like.

Referring now to FIGS. 1-4, the headrest 10 further includes the extension cushion 22 disposed within the channel 26 (FIG. 4) and translatable between a stowed position 52 (FIG. 1) in which the extension cushion 22 is stored within the channel 26 and an extended position 54 (FIGS. 2 and 3) in which the extension cushion 22 extends from the housing 20. That is, as shown in exploded view in FIG. 6, the extension cushion 22 may fit within the channel 26 when in the stowed position 52 (FIG. 1), and may protrude from one lateral side 32, 34 of the housing 20 when in the extended position 54 (FIGS. 2 and 3). Therefore, the extension cushion 22 may be laterally translatable within the channel 26 along the horizontal axis 30 and may be deployed to protrude from one of the first end 36 and the second end 38 to thereby enlarge or extend the rest surface 18 when the extension cushion 22 is in the extended position 54, as set forth in more detail below.

In particular, as best shown in FIGS. 2, 3, and 6, the extension cushion 22 may be translatable along the horizontal axis 30 (FIG. 2) to thereby extend out of one of the first void 40 (FIG. 6) and the second void 44 (FIG. 6) in the extended position 54 (FIGS. 2 and 3). Although shown as protruding from the second void 44 at the second end 38 along the second lateral side 34 of the housing 20 in FIG. 2, the extension cushion 22 may likewise protrude from the first void 40 at the first end 36 along the first lateral side 32 of the housing 20 according to a preference of the occupant.

Referring now to FIG. 4, the extension cushion 22 may have a front surface 56 that faces the housing 20, and a back surface 58 spaced opposite the front surface 56 and substantially parallel to the central longitudinal axis 28. The extension cushion 22 may also have a top surface 60 interconnecting the front surface 56 and the back surface 58, and a bottom surface 62 spaced opposite the top surface 60 and substantially perpendicular to the central longitudinal axis 28. The front surface 56, back surface 58, top surface 60, and bottom surface 62 may form the faces or sides of the extension cushion 22. In one non-limiting example, the extension cushion 22 may be hollow so as to contribute to a lightweighting of the seat 12 and vehicle 16.

As shown in FIG. 4, the back surface 58 may have a first length 64 and the front surface 56 may have a second length 66 that is less than the first length 64. As such, the extension cushion 22 may also be concave with respect to the central longitudinal axis 28 and may match a concavity of the channel 26. That is, the back surface 58 may be taller or longer than the front surface 56 such that the extension cushion 22 may slope forward toward a head of the occupant to provide a comfortable extension of the rest surface 18 (FIG. 2) when the extension cushion 22 is in the extended position 54 (FIGS. 2 and 3).

Referring now to FIGS. 7A and 7B, the back surface 58 of the extension cushion 22 may define a plurality of slots 68 (FIG. 7B) therein extending in a direction substantially parallel to the horizontal axis 30. For example, the back surface 58 may define two slots 68 therein. Further, as shown in FIG. 7A, the headrest 10 may further include a plurality of pins 70 each affixed to the primary support cushion 48 and disposed within one of the plurality of slots 68. That is, each of the plurality of pins 70 may affix the extension cushion 22 to the headrest 10, but may also allow the extension cushion 22 to slide or translate laterally within the channel 26.

Referring now to FIGS. 4 and 6, the headrest 10 may also include a frame member 72 attached to the housing 20 and defining a cavity 74 therein. That is, the frame member 72 may form an outer shell or back half of the headrest 10 and may be attached to the housing 20 to enclose the cavity 74. Although not shown, the cavity 74 may house adjustment components, sensors, or other structural elements of the headrest 10.

For example, as described with reference to FIG. 6, the headrest 10 may further include a worm and pinion gear 76 disposed within the cavity 74 and configured for translating the extension cushion 22 between the stowed position 52 (FIG. 1) and the extended position 54 (FIGS. 2 and 3). The worm and pinion gear 76 may interface with a rail 78 (FIG. 7B) that defines notches 80 therein and is disposed on the back surface 58 of the extension cushion 22. Although shown generally in FIG. 6, the worm and pinion gear 76 may include gear teeth (not shown) that may engage with the notches 80 as the worm and pinion gear 76 translates the extension cushion 22 laterally within the channel 26.

In addition, with continued reference to FIG. 6, the headrest 10 may further include an actuator 82 disposed within the cavity 74 and configured for electrically controlling a position of the worm and pinion gear 76 without a need for a separate stopper to control positioning of the extension cushion 22. More specifically, the actuator 82 may be transitionable between an off condition 84 in which the extension cushion 22 is not translatable between the stowed position 52 (FIG. 5) and the extended position 54 (FIGS. 2 and 3) and an on condition 86 in which the actuator 82 electrically controls the position of the worm and pinion gear 76 and the extension cushion 22 is translatable between the stowed position 52 and the extended position 54. Although shown generally in FIG. 6, the headrest 10 may also include a switch 88 that is controllable by the operator to energize the actuator 82 when the vehicle 16 is in the parked state 24 (FIG. 2).

Therefore, in operation, when the vehicle 16 is in the parked state 24 and the occupant wishes to recline, take a break, rest, or sleep in the seat 12, the occupant may press the switch 88 to activate the actuator 82, which may in turn actuate the worm and pinion gear 76 to engage with the rail 78 such that the extension cushion 22 traverses laterally within the channel 26 from the stowed position 52 to the extended position 54, thereby increasing a size of the rest surface 18 and providing a larger area to place the head and upper spine of the occupant for the duration of the break, rest, and sleep.

Advantageously, the headrest 10 minimizes discomfort that may be associated with resting or sleeping against other head restraints that do not adjust, offer limited adjustability, or merely adjust vertically. That is, the headrest 10 described herein adequately supports the head and neck of the occupant in various resting positions. As such, the headrest 10 minimizes head and neck strain during long periods of rest, sleep, or sedentary time in the vehicle 16. The headrest 10 and extension cushion 22 therefore enhance occupant comfort during parking breaks and provide an enjoyable and ergonomic experience for occupants resting or sleeping in vehicles 16. Further, the headrest 10 provides the occupant with choice and flexibility regarding positioning and surface area of the rest surface 18 according to a desired resting or sleeping position.

In addition, the extension cushion 22 does not detract from a rigidity of the housing 20 and headrest 10. That is, the housing 20 may maintain rigidity both when the cushion 22 is in the extended position 54 and when the extension cushion 22 is in the stowed position 52. As such, the headrest 10 may protect and support the occupant during a sudden deceleration or change in momentum or direction of the vehicle 16, and upon contact between the vehicle 16 and an object external to the vehicle 16.

Referring now to FIG. 5, the vehicle 16 includes a body 90 defining a passenger compartment 92 and the seat 12 disposed within the passenger compartment 92. The body 90 may partially or totally enclose the passenger compartment 92, and the passenger compartment 92 may be configured to house at least one occupant. As shown in FIG. 1, the seat 12 includes a seat frame 94, a seating surface 96 supported by the seat frame 94, and the headrest 10 attached to the seating surface 96.

In addition to the characteristics, structure, and functionality of the headrest 10 set forth above, i.e., that the headrest 10 includes the extension cushion 22 that is laterally translatable along the channel 26 within the housing 20, the headrest 10 may also be vertically adjustable. That is, as best shown in FIG. 6, the headrest 10 may be translatable along the central longitudinal axis 28 to thereby adjust a spacing 98 between the headrest 10 and the seating surface 96. Therefore, the headrest 10 may be both vertically adjustable and laterally adjustable to enhance occupant comfort and reduce occupant fatigue.

As best shown in FIG. 1, the seat frame 94 may be a structural base of the seat 12, may be formed from metal, and may provide mounting points for other components of the seat 12. The seating surface 96 may be mounted or attached to and supported by the seat frame 94 and may in turn support the seated occupant. In particular, the seating surface 96 may include a seat cushion 100 and a seat back 102 attached to the seat cushion 100.

In one non-limiting example, the vehicle 16 may include a plurality of seats 12 arranged in a plurality of rows 104. Further, each of the plurality of rows 104 may include at least one of the plurality of seats 12. That is, the vehicle 16 may include at least two seats 12 and at least two rows 104, i.e., a first seat 12 disposed in a front row 104 and a second seat 12 disposed in a back row 104. In other examples, the vehicle 16 may include eight seats 12 arranged into three rows 104. Alternatively, for mass transportation applications, the vehicle 16 may include numerous rows 104 and numerous seats 12. In addition, any number or combination of the seats 12 may include the headrest 10. That is, although at least one of the seats 12 of the vehicle 16 includes the headrest 10, each seat 12 in the front row 104 may include the headrest 10, and one or more seats 12 of a second or third row 104 may include the headrest 10.

Further, as described with reference to FIGS. 2 and 5, the vehicle 16 may be transitionable between the parked state 24 (FIG. 2) in which the vehicle 16 is stationary and the extension cushion 22 is translatable from the stowed position 52 to the extended position 54, and a driving state 106 (FIG. 5) in which the vehicle 16 is not in the parked state 24 and the extension cushion 22 is not translatable to the extended position 54. That is, the vehicle 16 may be characterized by two states 24, 106, i.e., the parked state 24 in which the vehicle 16 is parked and the driving state 106 in which the vehicle 16 is not parked. As such, the driving state 106 may include conditions in which the vehicle 16 may be moving, or conditions in which the vehicle 16 may be stationary or paused while a transmission of the vehicle is in a neutral, reverse, or driving gear. That is, the driving state 106 may include idling.

However, to reiterate, the extension cushion 22 may extend from the housing 20 when the vehicle 16 is in the parked state 24. Conversely, the extension cushion 22 may not extend from the housing 20 when the vehicle 16 is in the driving state 106. Further, the extension cushion 22 may automatically realign to center within the channel 26 without manual manipulation of the extension cushion 22 when the vehicle 16 transitions to the driving state 106, as set forth in more detail below.

Figure 8:
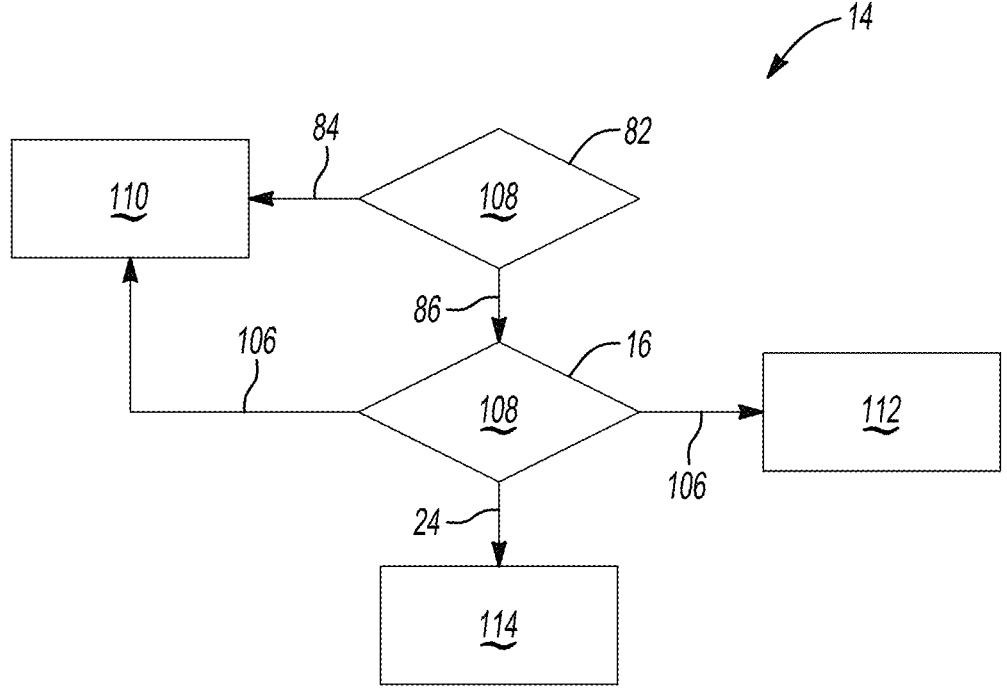
FIG. 8 is a flow diagram of a method of adjusting the headrest of FIGS. 1 and 2.

Referring now to FIG. 8, the method 14 of adjusting the headrest 10 includes determining 108 whether the vehicle 16 is in the parked state 24 or the driving state 106 and whether the actuator 82 is in the on condition 86 or the off condition 84. Determining 108 may include checking, assessing, or communicating with one or more of an electronic control unit (not shown), body control module (not shown), sensor, accelerometer, and the like to verify a state 24, 106 of the vehicle 16 and a condition 84, 86 of the actuator 82. As set forth in more detail below, for the extension cushion 22 to translate from the stowed position 52 (FIG. 5) to the extended position 54 (FIGS. 2 and 3), the vehicle 16 is disposed in the parked state 24 and the actuator 82 is in the on condition 86. Further, for the extension cushion 22 to translate from the extended position 54 to the stowed position 52, i) the vehicle 16 is disposed in the parked state 24 and the actuator 82 is in the off condition 84; ii) the vehicle 16 is disposed in the driving state 106 and the actuator 82 is in the on condition 86; or iii) the vehicle 16 is disposed in the driving state 106 and the actuator 82 is in the off condition 84.

More specifically, as described with continued reference to FIG. 8, if the actuator 82 is in the off condition 84, the method 14 includes holding 110 the headrest 10 within the channel 26 such that the extension cushion 22 does not translate from the stowed position 52 to the extended position 54. That is, the extension cushion 22 may not operate or translate through the channel 26 until the operator actuates the actuator 82, for example, by pressing the switch 88 (FIG. 6).

However, if the actuator 82 is in the on condition 86 and the vehicle 16 is in the driving state 106, the method 14 includes at least one of: a) holding 110 the headrest 10 within the channel 26 such that the extension cushion 22 does not translate from the stowed position 52 to the extended position 54, and b) automatically translating 112 the headrest 10 from the extended position 54 to the stowed position 52.

For example, in a first case a), if the vehicle 16 is in the driving state 106 and the occupant electrically energizes the actuator 82 and the extension cushion 22 is in the stowed position 52 within the channel 26, the method 14 includes preventing the extension cushion 22 from translating within the channel 26 to the extended position 54 since the vehicle 16 is not in the parked state 24. That is, holding 110 may include keeping the extension cushion 22 stowed within the channel 26 or storing the extension cushion 22.

However, in a second case b), if the vehicle 16 is in the driving state 106 and the occupant inadvertently or deliberately electrically energizes the actuator 82 and the extension cushion 22 is already protruding from the housing 20 and channel 26 in the extended position 54, the method 14 includes automatically translating 112 or retracting the headrest 10 from the extended position 54 to the stowed position 52. That is, automatically translating 112 may include stowing or repositioning the extension cushion 22 to the stowed position 52. Such a situation may occur when, for example, the occupant quickly shifts from a parked gear to a drive gear with the extension cushion 22 in the extended position 54 or while actuating the actuator 82, or when the occupant unintentionally depresses the switch 88 (FIG. 6) in an attempt to actuate the actuator 82 while driving. Therefore, the method 14 provides convenient operation of the extension cushion 22 and ensures that the headrest 10 is optimally positioned for support and comfort of the occupant.

Referring again to FIG. 8, if the actuator 82 is in the on condition 86 and the vehicle 16 is in the parked state 24, the method 14 includes translating 114 the headrest 10 from the stowed position 52 to the extended position 54 to thereby adjust the headrest 10. That is, the occupant may extend the extension cushion 22 to the extended position 54 when the vehicle 16 is in the parked state 24, but not when the vehicle 16 is in the driving state 106. As such, translating 114 the headrest 10 from the stowed position 52 to the extended position 54 may include laterally elongating the headrest 10 from one of the first lateral side 32 and the second lateral side 34 by protruding the extension cushion 22 from the housing 20 and channel 26. Therefore, the occupant may use the extension cushion 22 in the extended position 54 to comfortably extend the resting surface 18 (FIGS. 2 and 3) for resting or sleeping while the vehicle 16 is parked.

Therefore, in summary, the headrest 10 and method 14 provide the occupant with an ability to adjust the headrest 10 laterally or horizontally and reduce discomfort during parking breaks or extended stops of the vehicle 16. Further, the headrest 10 and method 14 allow for a tailored position of the headrest 10 to accommodate individual preferences and sleeping habits, which may promote better relaxation and minimize neck strain. In addition, even with inclusion of the extension cushion 22 in the headrest 10, the headrest 10 maintains rigidity and effectively supports and protects the occupant upon a sudden deceleration or change in momentum or direction of the vehicle 16, or upon contact between the vehicle 16 and an object external to the vehicle 16.

The described embodiments of the present disclosure are intended to serve as non-limiting examples, and other embodiments may take various and alternative forms. In addition, the appended drawings are not necessarily to scale, and may present a somewhat simplified representation of various features of the present disclosure, including, for example, specific dimensions, orientations, locations, and shapes. Details associated with such features will be determined in part by the intended application and use environment of the described embodiments.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. In addition, the use of ordinals such as first, second and third does not necessarily imply a ranked sense of order, but rather may merely distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A headrest comprising:
   a housing defining a channel therethrough;
   a primary support cushion disposed on the housing; and
   an extension cushion disposed within the channel and
     translatable between a stowed position in which the
     extension cushion is stored within the channel and an
     extended position in which the extension cushion
     extends from the housing; wherein the housing has: a
     central longitudinal axis; a horizontal axis that is perpendicular to the central longitudinal axis; a first lateral side spaced apart from the central longitudinal axis along the horizontal axis; and a second lateral side spaced apart from the central longitudinal axis and the first lateral side along the horizontal axis; wherein the housing further defines: a first void at a first end of the channel that extends along a first axis that is substantially parallel to the central longitudinal axis on the first lateral side; and a second void at a second end of the channel that extends along a second axis that is substantially parallel to the central longitudinal axis on the second lateral side; and wherein the extension cushion is translatable along the horizontal axis to thereby be capable of extending out of either the first void or the second void in the extended position.

2. The headrest of claim 1, wherein the extension cushion is laterally translatable within the channel.

3. The headrest of claim 1, wherein the primary support cushion has a rest surface;

wherein the channel includes a first end and a second end laterally spaced apart from the first end; and further wherein the extension cushion protrudes from one of the first end and the second end to thereby extend the rest surface when the extension cushion is in the extended position.

4. The headrest of claim 1, wherein the extension cushion has:

a front surface that faces the housing;

a back surface spaced opposite the front surface and substantially parallel to the central longitudinal axis;

a top surface interconnecting the front surface and the back surface; and a bottom surface spaced opposite the top surface and substantially perpendicular to the central longitudinal axis.

5. The headrest of claim 4, wherein the extension cushion is hollow and concave with respect to the central longitudinal axis.

6. The headrest of claim 4, wherein the back surface has a first length and the front surface has a second length that is less than the first length.

7. The headrest of claim 4, wherein the back surface defines a plurality of slots therein extending in a direction substantially parallel to the horizontal axis.

8. The headrest of claim 7, further including a plurality of pins each affixed to the primary support cushion and disposed within one of the plurality of slots.

9. The headrest of claim 4, further including a member attached to the housing and defining a cavity therein.

10. The headrest of claim 9, further including a worm and pinion gear disposed within the cavity and configured for translating the extension cushion between the stowed position and the extended position.

11. The headrest of claim 10, further including an actuator disposed within the cavity and configured for electrically controlling a position of the worm and pinion gear and transitionable between:

an off condition in which the extension cushion is not translatable between the stowed position and the extended position; and an on condition in which the actuator electrically controls the position of the worm and pinion gear and the extension cushion is translatable between the stowed position and the extended position.

12. The headrest of claim 1, wherein the housing is rigid and formed from a metal and the primary support cushion is resilient and formed from a foam; and further including a cover disposed on the primary support cushion.

13. A seat for a vehicle, wherein the seat includes the headrest of claim 1.

14. A vehicle comprising:

a body defining a passenger compartment; and a seat disposed within the passenger compartment and including:

a seat frame;

a seating surface supported by the seat frame; and a headrest attached to the seat frame and including:

a housing defining a channel therethrough;

a primary support cushion disposed on the housing; and an extension cushion disposed within the channel and translatable between a stowed position in which the extension cushion is stored within the channel and an extended position in which the extension cushion extends from the channel; wherein the housing has: a central longitudinal axis; a horizontal axis that is perpendicular to the central longitudinal axis; a first lateral side spaced apart from the central longitudinal axis along the horizontal axis; and a second lateral side spaced apart from the central longitudinal axis and the first lateral side along the horizontal axis; wherein the housing further defines: a first void at a first end of the channel that extends along a first axis that is substantially parallel to the central longitudinal axis on the first lateral side; and a second void at a second end of the channel that extends along a second axis that is substantially parallel to the central longitudinal axis on the second lateral side; and wherein the extension cushion is translatable along the horizontal axis to thereby be capable of extending out of either the first void or the second void in the extended position.

15. The vehicle of claim 14, further including a plurality of said seat arranged in a plurality of rows, wherein each of the plurality of rows includes at least one of the plurality of seats.

16. The vehicle of claim 15, wherein the vehicle is transitionable between:

a parked state in which the vehicle is stationary and the extension cushion is translatable from the stowed position to the extended position; and a driving state in which the vehicle is not in the parked state and the extension cushion is not translatable to the extended position.

17. The vehicle of claim 16, wherein the housing has:

a central longitudinal axis;

a horizontal axis that is perpendicular to the central longitudinal axis;

a first lateral side spaced apart from the central longitudinal axis along the horizontal axis; and a second lateral side spaced apart from the central longitudinal axis and the first lateral side along the horizontal axis;

wherein the headrest is translatable along the central longitudinal axis to thereby adjust a spacing between the headrest and the seating surface; and wherein the extension cushion is laterally translatable within the channel along the horizontal axis.

18. A method of adjusting a headrest, the method comprising:

determining whether a vehicle is in a parked state or a driving state and whether an actuator is in an on condition or an off condition;

wherein the vehicle includes:

a body defining a passenger compartment; and a seat disposed within the passenger compartment and including:

a seat frame;

a seating surface supported by the seat frame; and a headrest attached to the seat frame and including:

a housing defining a channel therethrough;

a primary support cushion disposed on the housing; and an extension cushion disposed within the channel and translatable between a stowed position in which the extension cushion is stored within the channel and an extended position in which the extension cushion extends from the channel; wherein the housing has: a central longitudinal axis; a horizontal axis that is perpendicular to the central longitudinal axis; a first lateral side spaced apart from the central longitudinal axis along the horizontal axis; and a second lateral side spaced apart from the central longitudinal axis and the first lateral side along the horizontal axis; wherein the housing further defines: a first void at a first end of the channel that extends along a first axis that is substantially parallel to the central longitudinal axis on the first lateral side; and a second void at a second end of the channel that extends along a second axis that is substantially parallel to the central longitudinal axis on the second lateral side; and wherein the extension cushion is translatable along the horizontal axis to thereby be capable of extending out of either the first void or the second void in the extended position;

if the actuator is in the off condition, holding the headrest within the channel such that the extension cushion does not translate from the stowed position to the extended position;

if the actuator is in the on condition and the vehicle is in the driving state, at least one of:

holding the headrest within the channel such that the extension cushion does not translate from the stowed position to the extended position; and automatically translating the headrest from the extended position to the stowed position; and if the actuator is in the on condition and the vehicle is in the parked state, translating the headrest from the stowed position to the extended position to thereby adjust the headrest.

19. The method of claim 18, wherein the housing includes:

a central longitudinal axis;

a horizontal axis that is perpendicular to the central longitudinal axis;

a first lateral side spaced apart from the central longitudinal axis along the horizontal axis; and a second lateral side spaced apart from the central longitudinal axis and the first lateral side along the horizontal axis; and wherein translating the headrest from the stowed position to the extended position includes laterally elongating the headrest from one of the first lateral side and the second lateral side.

* * * * *